United States Patent

[11] 3,628,769

[72] Inventor Wilfred J. Lee
 East Syracuse, N.Y.
[21] Appl. No. 47,837
[22] Filed June 19, 1970
[45] Patented Dec. 21, 1971
[73] Assignee Clarkson Industries, Inc.
 Syracuse, N.Y.

[54] ROTARY VALVED VACUUM CLEANING SYSTEM OUTLET
 9 Claims, 5 Drawing Figs.

[52] U.S. Cl. .................................................. 251/149.9,
 285/7, 15/31 A, 137/360
[51] Int. Cl. .................................................. F16l 37/28
[50] Field of Search ........................................ 251/149.9,
 147, 310, 299; 285/7; 15/314; 137/360

[56] References Cited
UNITED STATES PATENTS
| | | | |
|---|---|---|---|
| 1,717,471 | 6/1929 | Spencer .................. | 251/299 X |
| 2,484,723 | 10/1949 | Pain ....................... | 251/310 |
| 3,357,039 | 12/1967 | Hayward .................. | 15/314 |
| 3,381,328 | 5/1968 | Szabo ..................... | 285/7 X |
| 3,477,689 | 11/1969 | Berghoefer ............... | 251/149.9 |

Primary Examiner—William R. Cline
Attorney—Curtis, Morris & Safford

ABSTRACT: The disclosure is directed to improvements in the outlets of a built-in vacuum system to which a cleaning hose may be detachably connected. Each outlet has a rotatable valve plug to eliminate air noise, which is provided with a sliding key that interlocks with the exposed end wall of the valve housing and a key actuator on the hose nipple which releases the valve plug for turning only when the hose nipple is seated in the outlet. The improved construction permits the valve plug to be removed from the exposed side of the valve housing for repair or replacement, and also permits adjustment of the end wall of the housing relative to the valve plug and insures alignment of the key and port opening in the valve plug with the keyhole and port opening in the valve housing, respectively, at the end of a turning movement of the valve plug.

3,628,769

INVENTOR.
WILFRED J. LEE

BY
Curtis, Morris & Safford
ATTORNEYS

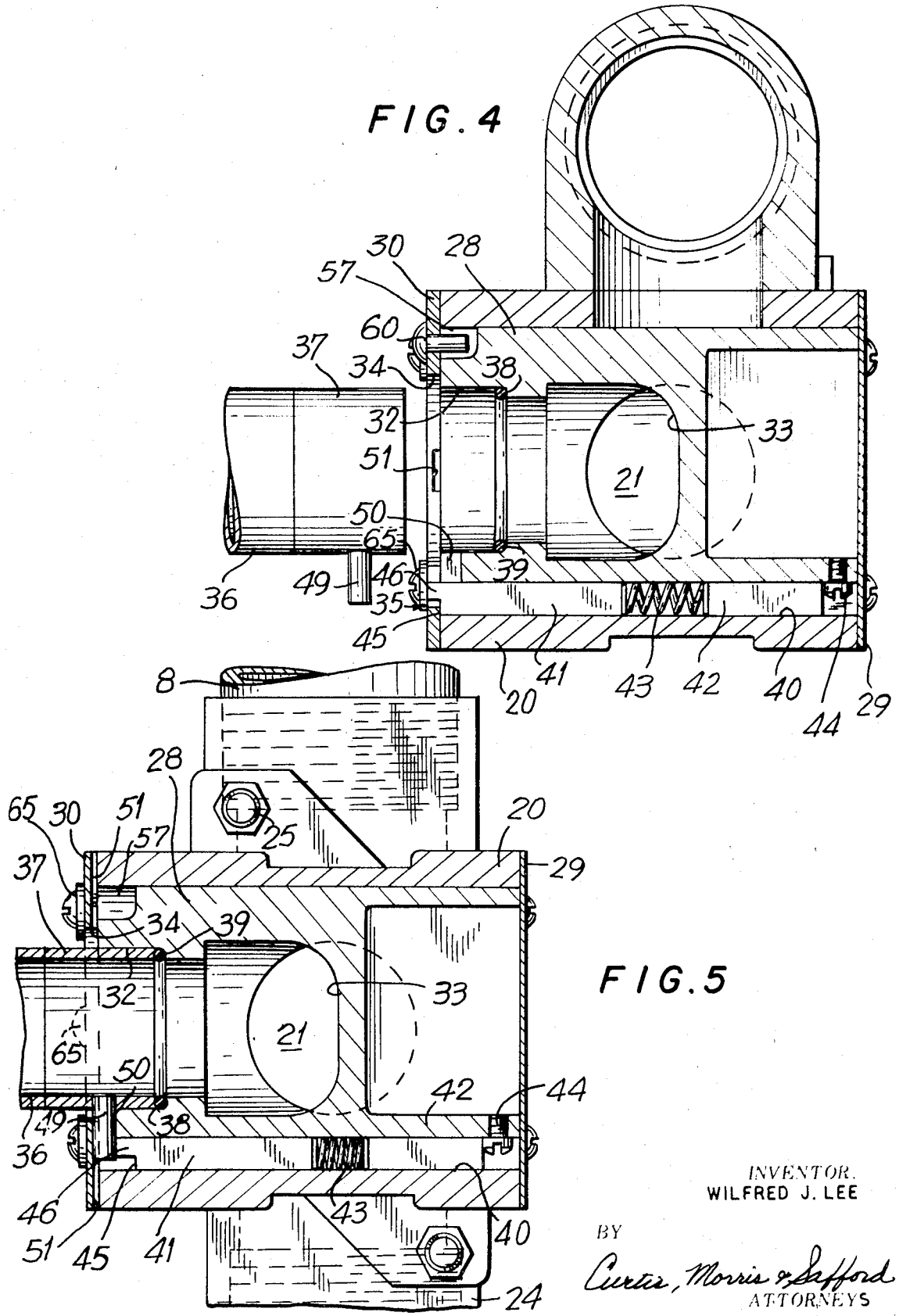

ROTARY VALVED VACUUM CLEANING SYSTEM OUTLET

The present invention relates to outlets for detachably connecting a hose to a piping system and more particularly to a coupling construction for connecting a flexible vacuum cleaning hose to a vacuum cleaning system of the type described and claimed in an application for United States Letters Patent of Hans Stuy Ser. No. 830,772,348 filed June 5, 1969 and entitled Silent Hose Coupling now U.S. Pat. No. 3,570,809.

The vacuum cleaning system described in the Stuy application is built-in or installed in large buildings to facilitate the cleaning of different areas thereof. Such vacuum cleaning systems comprise an exhauster connected to a piping system in the walls of the building and having an outlet in at least one wall of each enclosed area where cleaning is required. When an area is to be cleaned the attendant inserts a nipple at one end of a flexible cleaning hose into an outlet in the wall of the enclosure to connect the hose to the exhauster through the piping. A cleaning tool, such as a hollow brush or elongated nozzle, is connected to the opposite end of the hose, either directly thereto or through an intermediate wand, and the brush or nozzle is passed over the surface to be cleaned, the same as with a conventional tank-type vacuum cleaner. When the hose is coupled to and uncoupled from the outlet of such built-in vacuum cleaning system the rush of atmospheric air between the nipple of the hose and the outlet is apt to produce undesirable air noises. In many installations, such as hospitals, libraries and other public rooms, such noise is particularly objectionable. Furthermore the couplings commonly used are not foolproof and many times become disconnected during use with a resulting noise, reduction in the partial vacuum produced by the exhauster, and other disadvantages.

One of the objects of the present invention is to provide an improved outlet for a vacuum cleaning system of the type indicated which prevents the rotatable valve in the outlet from being turned to its open position until the end of the cleaning hose has been seated in the outlet and prevents the cleaning hose from being detached from the outlet until the valve has been turned to its closed position.

Another object is to provide an improved outlet for a vacuum cleaning system which facilitates the removal of the valve plug for repair or replacement.

Still another object is to provide an improved outlet for a vacuum cleaning system which is of a simplified and more compact construction, is economical to manufacture, and one which is reliable in operation.

These and other objects will become more apparent from the following description and drawings, in which like reference characters denote like parts throughout the several views. It is to be expressly understood, however, that the drawings are for the purpose of illustration only and are not a definition of the limits of the invention, reference being had for this purpose to the appended claims.

In the drawings:

FIG. 4 is a sectional plan view taken on line 4—4 of FIG. 3 to show the manner in which the key actuator on the hose nipple engages the key on the valve plug to release the latter for turning movement in the housing;

FIG. 5 is a sectional view like FIG. 3 and showing the hose nipple and valve plug turned to its open position and the hose nipple interlocked with the end wall of the housing.

The improved outlet of the present invention connects and disconnects one end of a flexible cleaning hose to the built-in piping of a vacuum cleaning system for the various rooms of a building. The outlet comprises a valve plug rotatably mounted in an enclosing housing and having a passageway therein forming port openings in its end and periphery, respectively. The end port is adapted to receive a nipple at one end of the cleaning hose and the peripheral port is movable into and out of register with a port opening in the housing when the valve plug is turned. One end wall of the housing overlies the end of the valve plug having the port opening and has an opening through which the hose nipple passes and a rectangular keyhole at one side of the opening. The end of a sliding key on the valve plug is spring pressed into the keyhole to interlock with the end wall of the housing when the hose nipple is withdrawn and a key actuator on the nipple engages and releases the key when the nipple is inserted to permit rotation of the valve plug to its open position. Upon turning movement of the valve plug and nipple the key actuator interlocks with the end wall of the housing to prevent removal of the hose nipple until the valve plug is rotated back to its closed position.

Figure 1:
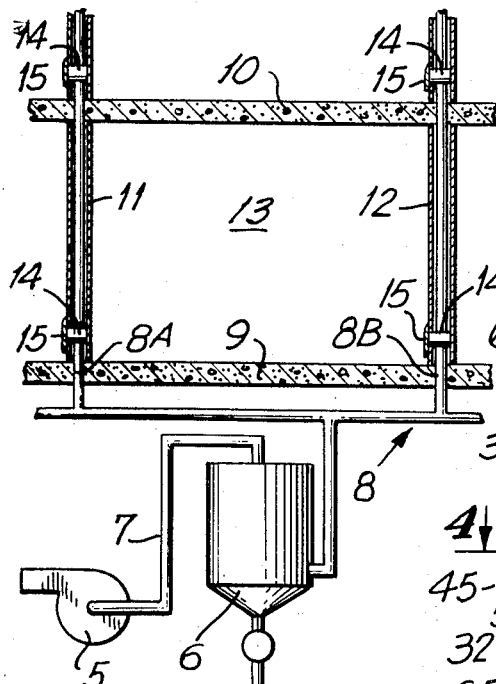
FIG. 1 is a sectional view of the two floors of a building having a built-in vacuum cleaning system with piping in the walls and showing the outlets in separate rooms which incorporate the novel features of the present invention.

Referring now to the drawings, the outlet of the present invention is shown applied to a built-in type vacuum cleaning system for a building having permanent piping in the walls thereof. As shown in FIG. 1, the vacuum cleaning system comprises an exhauster 5 connected to a dust separator 6 through a conduit 7. The exhauster 5 and dust separator 6 may be located at any suitable place, such as the basement of the building. The lower end of the dust separator 6 is connected to a piping system 8 having sections such as 8–A and 8–B extending through the floors 9 and 10 and walls 11 and 12 of the building enclosing different areas or rooms such as 13. Each section 8–A and 8–B of the piping system 8 has outlets 14 to which one end of a detachable cleaning hose may be connected. Outlets 14 have one end only adapted for connection to a hose. As shown in FIG. 1, each outlet is covered by a hinged cover plate 15 on the partition walls 11 and 12 which normally overlie the outlet but which may be lifted away from the outlet when a cleaning operation is to be performed.

Figure 3:
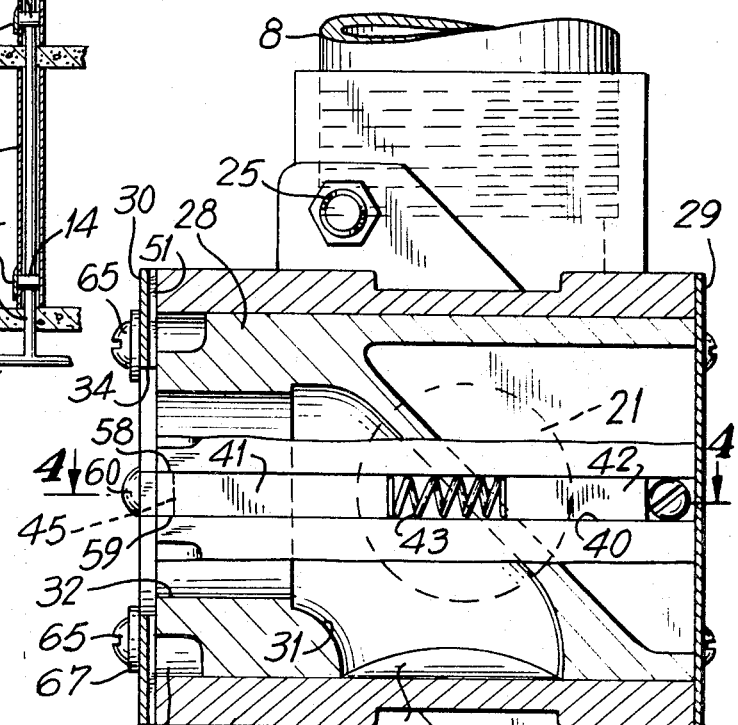
FIG. 3 is a sectional side elevational view taken on line 3—3 of FIG. 2 to show the sliding key on the valve plug which interlocks with the keyhole on the end wall of the housing.
Figure 2:
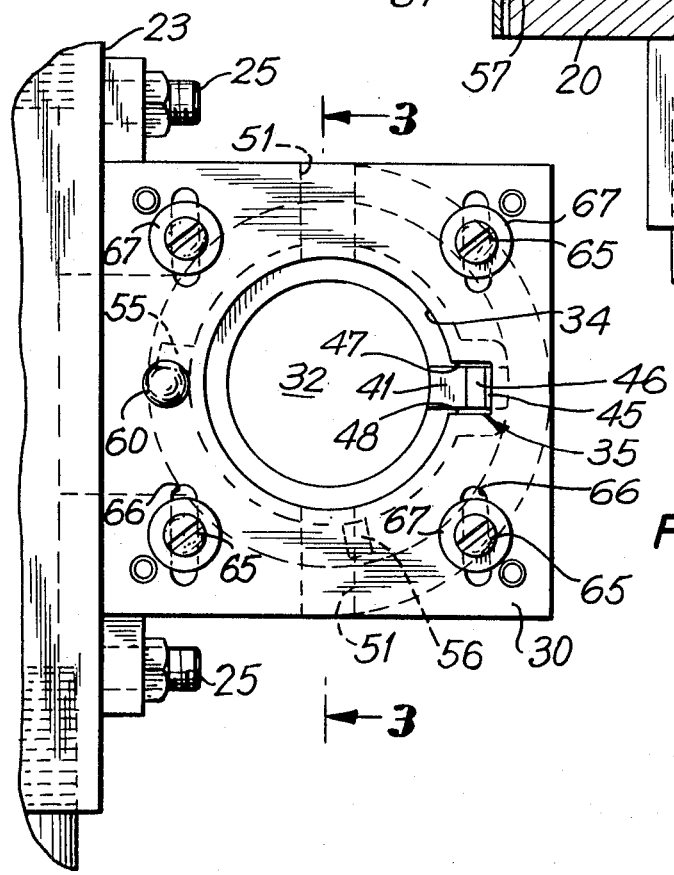
FIG. 2 is an enlarged front elevational view of one of the outlets illustrated in FIG. 1 and showing the circular opening in the end wall of the housing through which the nipple at the end of the cleaning hose is inserted.

Each outlet 14 comprises a hollow cylindrical housing 20, see FIG. 3, having an outlet port 21 in the wall thereof. As shown in FIGS. 2 and 3, the housing 20 is connected by means of bolts 25 to a saddle 23 of a pipe fitting 24 in the piping system 8. A valve plug 28 of the same cylindrical contour as the housing 20 is adapted to closely fit the walls thereof and is held in place in the housing by end plates 29 and 30 forming walls of the housing. It will be understood that the housing 20 and valve plug 28 are illustrated as cylindrical that they may be slightly tapered to have a frustoconical shape. The valve plug 28 has a passageway 31 forming an axially located port 32 at one end and a radial port 33 at its periphery at the opposite end.

The end plate 29 closes the rearward end of the circular housing 20, but end plate 30 has a circular opening 34 of a size and shape corresponding to but larger than the axial port 32 in the valve plug 28 with a rectangular keyhole slot 35 at one side thereof.

The flexible cleaning hose 36 has a nipple 37 at one end, see FIGS. 4 and 5, adapted to enter the housing through the circular opening 34 in the endplate 30. The nipple 37 and axial port 32 may have a corresponding taper to seat, one in the other, in sealing engagement, or the end of the nipple may seat against a gasket in the valve, or O-rings may be provided between the nipple and valve to produce an airtight seal when the nipple is moved axially through the end plate 30 into the port opening 32 in the valve plug 28. In the illustrated embodiment a gasket 38 is provided between a shoulder 39 in the sidewall of the port 32 in the valve plug 28 for engagement by the end of the hose nipple 37, see FIG. 5. As thus far described, the outlet 14 is substantially identical with that described and claimed in the Stuy application, referred to above.

In accordance with the present invention a keyway 40 is provided in the outer periphery of the valve plug 28, see FIG.

3, extending longitudinally thereof parallel to its axis throughout its length. Mounted in the keyway 40 are a pair of keys 41 and 42 with a compression spring 43 between the adjacent ends thereof. Keys 41 and 42 are flush with the outer periphery of valve plug 28. Key 42 acts merely as a spacer and is held against movement rearwardly by engagement with a stop 44 screwed into the bottom of the keyway and against movement forwardly by a spring 43. Key 41 is pressed forwardly by spring 43, see FIG. 3, and its forward end is cut away as shown most clearly in FIG. 4 to form a shoulder 45 which engages the back of the end plate 30 to limit its forward movement and a tongue 46 projecting forwardly from the shoulder into the keyhole slot 35. The forwardly projecting tongue 46 then is positioned between the sides 47 and 48 of the slot 35 to lock the valve plug 28 against rotation. The valve plug 28 is unlocked by a key actuator 49 projecting radially from the hose nipple 37. When the hose nipple 37 is inserted into its axial port 32 of the valve plug 28 the key actuator 49 in the form of a pin engages the tongue 46 at the end of the key 41 and presses the key rearwardly against the action of the spring 43 until the forward end of the tongue is positioned rearwardly of the end plate 30, see FIG. 5. For this purpose the forward end of the valve plug 28 is slotted under the key 90 as at 50 to permit passage of the key actuator pin 49 on the hose nipple 37 beyond the end of the valve plug 28 when the hose nipple 37 is inserted into the port opening 32 of the valve plug. The hose nipple 37 is and valve plug 28 can then be turned to register port 33 on the valve plug 28 with the port 21 in the housing 20 to connect the hose to the fixed piping 8 of the vacuum system.

As soon as the valve plug 28 is turned the pin 49 on the hose nipple 37 is positioned at the rear of the end plate 30 which prevents the removal of the nipple until it has been turned back into register with the keyhole slot 35 in the end plate. The rearward face of the end plate 30 is provided with a shallow recess 51, see FIGS. 4 and 5, into which the pin 49 on the hose nipple 37 seats to indicate a fully open position of the valve plug 28 and which also provides a releasable catch to prevent accidental turning of the valve plug after it has been opened.

The valve plug 28 is also provided with stops 55 and 56 to limit its turning movement. To this end, the outer periphery of the forward end of the valve plug 28 is cut away to provide a peripheral recess 57 around its entire periphery except at the sides of the keyway 40 to provide shoulders 58 and 59 engaged by the pin 49 on the hose nipple 37. A fixed stop 60, shown in the form of a rivet, projects rearwardly from the end plate 30 into the annular recess 57 in the forward end of the valve plug 28 and between the stops 55 and 56 projecting radially from the valve plug. Thus, engagement of either of the stops 55 or 56 on the valve plug 28 with the fixed stop 60 on the end plate 30 limits the rotary movement of the valve plug.

End plate 30 is attached to the cylindrical body of the housing 20 by means of screws 65 which are screwed into threaded holes in the housing. The screws 65 extend through enlarged holes 66 in the end plate 30 which facilitates attachment and permits adjustment of the end plate on the housing. To this end, washers 67 are provided between the heads of the screws 65 and end plate 30 to permit such adjustment. One form of the invention having now been described in detail, the mode of operation is next explained.

When an area is to be cleaned, such as the room 13 illustrated in FIG. 1, the nipple 37 at the end of the cleaning hose 36 is inserted in an outlet 14 in a manner illustrated in FIGS. 4 and 5. In order to insert the nipple 37, the radial pin 49 has to be aligned with the keyhole slot 35 in the circular opening 34 in the end plate 30 and pressed axially into the open end of the axial port 32 in the valve plug 28 until the end of the nipple engages gasket 38, see FIG. 5, and seals the joint between the parts. Also the axial movement of the hose nipple 37 engages the radial pin 49 with the forwardly projecting tongue 46 at the forward end of the key and moves it axially until it and the pin is positioned at the rear of the end plate 30, see FIG. 5, to release the valve plug 28. The hose nipple 37 is then turned clockwise as viewed in FIG. 2 and the radial pin 49 on the nipple located in the slot 50 and keyway 40 rotates the valve plug 28 until its outlet port 33 aligns with the port 21 in the valve housing 20, see FIG. 5. Thus, the nipple 37 must be seated in sealing engagement in the port 37 in the end of the valve plug 28 before the valve can be turned to align the outlet ports 33 and 21. This prevents any leakage of air between the parts which would create an undesirable air noise.

Simultaneously the turning of the hose nipple 55 engages the pin 49 projecting radially from nipple 37 with the rearward face of the end plate 30 to interlock the parts and prevent removal of the hose until the valve 28 has been turned back to a closed position. Thus, any possibility of air leakage and noise is prevented during the connection or disconnection of the hose nipple 37 and valve plug 28, constituting a coupling, and when once coupled the nipple is interlocked with the end plate 30 until the radial valve port 33 is moved out of register with the outlet port 21 in the valve housing 20, see FIG. 5. Registry of port 33 in the valve plug 28 with the port 21 in the housing is insured by the engagement of detent 56 with stop 60 on the end wall and the valve plug is releasably held in position by the engagement of pin 49 on the hose nipple 37 with the recess 51 in the end plate.

After a cleaning operation has been completed the hose nipple 55 is rotated in the opposite direction through 90° from the position shown in FIG. 5 back to that shown in FIG. 4, at which time the radial pin 49 aligns with keyhole slot 35 in the end plate 30 so that the hose nipple may be withdrawn from the outlet 14. The closed position of the valve plug 28 also is insured by the engagement of detent 55 on the valve plug with the stop 60 on the end plate 30 of the housing 20.

At any time when any adjustment, repair or replacement of the valve plug 28 is required, the latter may be withdrawn from the housing 20 at the end where the hose nipple 37 is inserted by merely removing the screws 65 and washers 67. The end plate 30 is then removed, which permits the valve plug to be withdrawn from the housing without marring or otherwise damaging the wall 11 or 12 of the room in which the outlet 14 is located. It will now be observed that the present invention provides an improved outlet for a vacuum cleaning system which prevents rotation of a closed valve until a cleaning hose has been inserted or removal of the cleaning hose after it has been inserted and the valve turned to its open position. It will also be observed that the present invention provides an improved structure in an outlet for a vacuum cleaning system which facilitates removal of the valve plug for repair or replacement. It will still further be observed that the present invention provides an outlet for a vacuum cleaning system having a simple and compact construction, adapted for economical manufacture, and one which is reliable in operation.

While a single embodiment of the invention is herein illustrated and described, it will be understood that modifications may be made in construction and arrangement of elements without departing from the spirit or scope of the invention. Therefore, without limitation in this respect, the invention is defined by the following claims.

I claim:

1. An outlet for a vacuum cleaning system of the type having a central exhauster connected to piping extending to different areas of a building with one of the outlets provided at each area for connecting a detachable cleaning hose to the exhauster and in which each outlet comprises a housing having a generally cylindrical wall with a port opening connected to the piping, a generally cylindrical valve plug rotatable in the housing and having a passageway therein forming port openings at one end and in its periphery, respectively, and a nipple at one end of the cleaning hose adapted to be inserted into the port opening in the end of the plug, that improvement comprising an end wall on the housing having an opening in alignment with the port opening in the end of the valve plug through which a nipple at one end of the cleaning hose is inserted, a keyhole in the end wall at one side of the opening, a key slidable in a keyway in the periphery of the valve plug and having an end projecting into the keyhole and interlocking with the end wall of the housing at the sides of the keyhole to lock the valve plug against rotation in the housing, and a pin projecting radially from the hose nipple to engage the end of the key and slide it rearwardly out of the keyhole when a hose nipple is inserted in the port opening in the valve plug to release the valve plug only when the hose nipple has been seated therein.

2. An outlet for a vacuum cleaning system comprising a central exhauster, piping connected to the exhauster and extending to different areas of a building, outlets from the piping at the different areas, a detachable cleaning hose having a nipple at one end for insertion into an outlet for connection to the exhauster, each of said outlets comprising housing having a generally cylindrical wall with a port opening therein connected to the piping, a generally cylindrical valve plug in the housing having a passageway forming a port opening at one end to receive the nipple of the cleaning hose and a port opening in its periphery movable into and out of register with the port opening in the housing when the valve plug is rotated, an end wall on the housing having a circular opening through which the hose nipple is inserted into the port opening in the end of the valve and a keyhole extending radial from one side of the circular opening, a keyway in the valve plug, a key mounted in the keyway and having one end projecting into the keyhole to interlock with the end wall of the housing at the sides of the keyhole, a spring biasing the key to move its end into the keyhole, and a key actuator projecting radially from the hose nipple to engage the end of the key and move it rearwardly out of the keyhole when the hose nipple is seated in port opening in the valve plug whereby to release the valve plug for rotation in the housing.

3. An outlet for a vacuum cleaning system in, accordance with claim 2 in which the spring for biasing the key is a coiled spring mounted in the keyway at the rear of the key, an abutment bar in the keyway at the rear of the spring and a stop in the keyway at the rear of the abutment.

4. An outlet for a vacuum cleaning system in accordance with claim 2 in which the end of the key adjacent the outer periphery of the valve plug is recessed to form a forwardly projecting tongue and a shoulder rearwardly of said tongue, and said keyhole extends radially from the circular opening for a distance less than maximum radial width of the key to cause the tongue to project into the keyhole and the shoulder to engage the rear of the end wall to limit the forward movement of the key.

5. An outlet for a vacuum cleaning system in accordance with claim 2 in which the key actuator is a pin, and the forward end of the valve plug is slotted under the keyway to provide shoulders engageable by the pin to turn the valve plug when the hose nipple is turned in opposite directions.

6. An outlet for a vacuum cleaning system in accordance with claim 5 in which the valve plug is recessed at its forward end adjacent the end wall of the housing, a stop projecting rearwardly from the end wall of the housing into the recess in the valve plug, and shoulders on the valve plug engageable with the stop to align the peripheral port opening in the valve plug with the port opening in the housing when the valve plug is turned to one position and align the key with the keyhole when the valve plug is turned to another position.

7. An outlet for a vacuum cleaning system in accordance with claim 2 in which the end wall is detachably connected to the housing whereby to adapt the valve plug to be withdrawn from the housing for repair and replacement.

8. An outlet for a vacuum cleaning system in accordance with claim 7 in which the end wall is detachably connected to the housing by screws passing through openings in the end wall, washers underlying the heads of the screws, and the holes in the end wall being larger than the screws to adapt the end wall to be adjusted relative to the generally cylindrical wall to align the circular opening therein with the port opening at the end of the valve plug.

9. An outlet for a vacuum cleaning system according to claim 5 in which the inner surface of said end wall has a shallow slot formed therein and positioned to receive said pin and act as a detent therefor when said valve plug has been rotated to fully open said outlet.

* * * * *